F. S. Pease,
Bellows Pump.
N°. 51,474.        Patented Dec. 12, 1865.
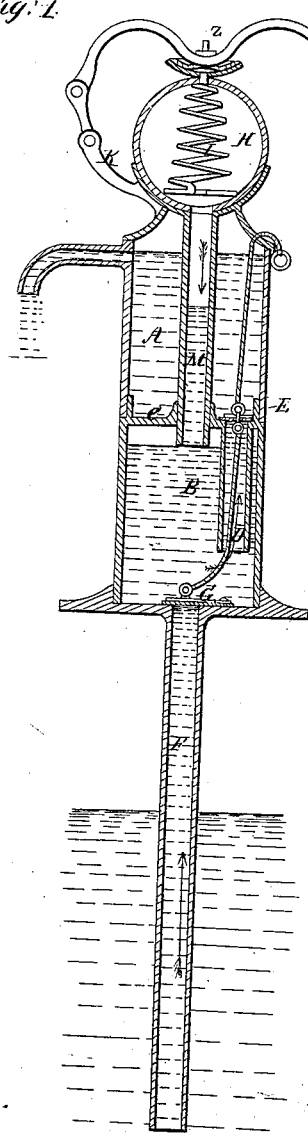
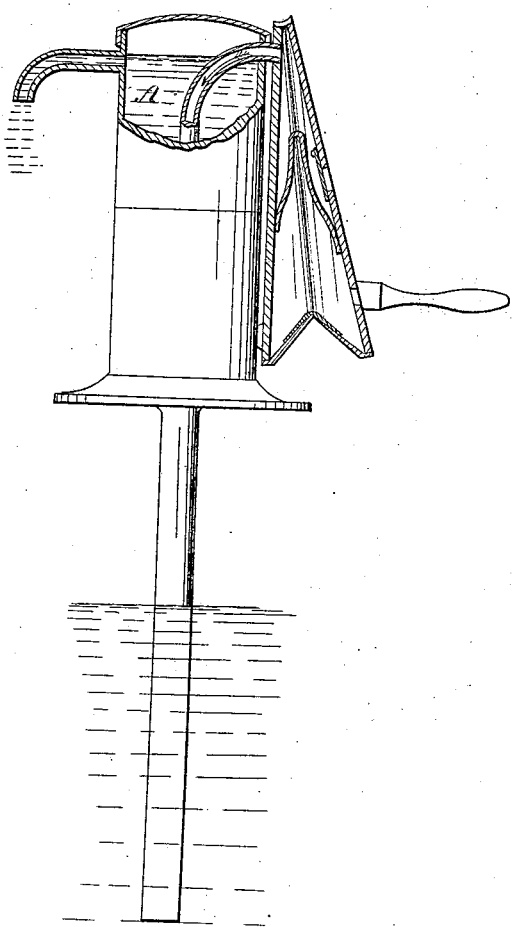

United States Patent Office.

F. S. PEASE, OF BUFFALO, NEW YORK.

IMPROVEMENT IN PUMPS.

Specification forming part of Letters Patent No. 51,474, dated December 12, 1865.

*To all whom it may concern:*

Be it known that I, F. S. PEASE, of Buffalo, in the county of Erie and State of New York, have made a new and useful Improvement in Pumps; and I do hereby declare the following to be a full, clear, and exact description of the nature, construction, and operation of the same, reference being had to the accompanying drawings, which are made part of this specification, and in which—

Figure 1 represents a vertical central section of my improvement. Fig. 2 shows a modification of the elastic air-chamber.

The same letters refer to corresponding parts in the different figures.

The construction of this pump as regards valve and passages is similar to that for which Letters Patent were granted to me bearing date the 28th of March, 1865, and the present invention consists of an improvement of said patented pump in respect of the application of the elastic air-chamber, from which the supply of air under pressure is afforded to raise the column of water.

To enable one skilled in the art to which my invention appertains to construct and use the same, I will proceed to describe it.

A B are two chambers, divided by a diaphragm, C, and communicating by a pipe, D, on the upper end of which is a valve, E. The lower end of the pipe F enters the water of the well and the upper end is provided with a valve, G.

H is an elastic chamber, with an internal spring, I, for the purpose of assisting in raising the handle and expanding the chamber H, which causes the indraft of water through the pipe F. The handle J has its fulcrum on an arm, K, projecting from the pump-chamber, and is attached at L to the upper side of the elastic chamber H, so as to expand and collapse the said chamber to produce the effective action of the air upon the water through the medium of the pipe M, which extends downwardly from the elastic chamber H, through the chamber A, and extending into the chamber B.

The valves G and E are connected by a cord or chain, by which the contents of the chambers may be discharged when required.

The operation is as follows: The pump being in running order, the handle is depressed, forcing the air out of the elastic chamber H and through the pipe M into the chamber B, where it presses upon the surface of the water, forcing it upwardly through the pipe D into the chamber A, where it is discharged at the nozzle. On the return or upward motion of the handle, the spring I assists to elevate the handle and expand the chamber H, which draws up the air through the pipe M, the water in the well rising through the pipe F to fill its place. As the handle again descends the valve G closes and the action before described is repeated.

The bellows device shown in Fig. 2 may be used instead of the spherical elastic chamber shown in Fig. 1.

Having described my invention, what I claim as new, and desire to secure by Letters Patent, is—

The elastic air-chamber, with its internal expanding-spring, in combination with the arrangement of valves and passages, substantially as described.

F. S. PEASE.

Witnesses:
   B. CORCORAN,
   F. P. PEASE.